United States Patent [19]

le Jeune

[11] Patent Number: 4,900,345
[45] Date of Patent: Feb. 13, 1990

[54] SEPARATOR FOR USE IN INSTALLATIONS FOR CONVEYING OBJECTS OVER DISTANCES BY MEANS OF A FLOW OF AIR

[75] Inventor: André le Jeune, Torcy, France

[73] Assignee: G.Mouson S.A. Air et Techniques, Paris, France

[21] Appl. No.: 260,715

[22] Filed: Oct. 21, 1988

[30] Foreign Application Priority Data

Oct. 23, 1987 [FR] France ................................ 87 14727

[51] Int. Cl.$^4$ ............................................ B01D 45/12
[52] U.S. Cl. .................................... 55/337; 55/459.5; 55/460; 209/144
[58] Field of Search ..................... 55/337, 435, 459.5, 55/460; 209/144

[56] References Cited

U.S. PATENT DOCUMENTS

| | | | |
|---|---|---|---|
| 667,459 | 2/1901 | Schreick et al. | 209/144 |
| 911,258 | 2/1909 | Neumann | 209/144 |
| 2,568,032 | 9/1951 | Stephanoff | 55/495.5 |
| 2,999,563 | 9/1961 | Wehn et al. | 55/435 |
| 3,061,098 | 10/1962 | Brezinski | 209/144 |
| 3,985,526 | 10/1976 | Phillippi | 209/144 |
| 4,222,754 | 9/1980 | Horvat | 55/302 |
| 4,344,783 | 8/1982 | Heinemann et al. | 209/144 |
| 4,572,726 | 2/1986 | Van Abbema | 55/337 |
| 4,600,410 | 7/1986 | Baillie et al. | 209/144 |
| 4,654,059 | 3/1987 | Matyas | 55/302 |

FOREIGN PATENT DOCUMENTS

| | | |
|---|---|---|
| 0094998 | 11/1983 | European Pat. Off. |
| 484499 | 10/1929 | Fed. Rep. of Germany ...... 209/144 |
| 587168 | 10/1933 | Fed. Rep. of Germany ...... 209/144 |
| 181592 | 4/1955 | Fed. Rep. of Germany ...... 209/144 |
| 1884826 | 3/1964 | Fed. Rep. of Germany . |
| 738734 | 12/1932 | France ................................ 209/144 |

Primary Examiner—Jay H. Woo
Assistant Examiner—C. Scott Bushey
Attorney, Agent, or Firm—Mason, Fenwick & Lawrence

[57] ABSTRACT

A separator for use in installations for conveying objects over distances by means of a flow of air, the separator including a generally cylindrical separator grid within a casing, and a spiral grid portion extending outside the cylindrical grid. The spiral grid portion is tangential to said cylindrical grid and to the outside wall of an inlet pipe for admitting an mixture of air and objects. The cylindrical grid and the spiral grid portions permit the passage of air, but not the objects. An adjustable flap is pivoted on the line of intersection between the inside wall of the inlet pipe and said cylindrical grid for controlling the flow of air and objects entering the separator. The spiral grid portion has a rough surface exposed to the gas flow.

4 Claims, 2 Drawing Sheets

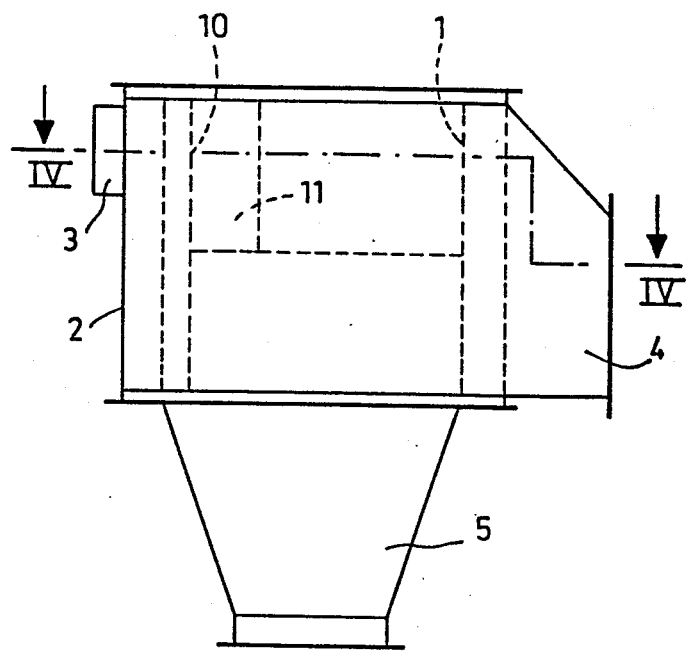
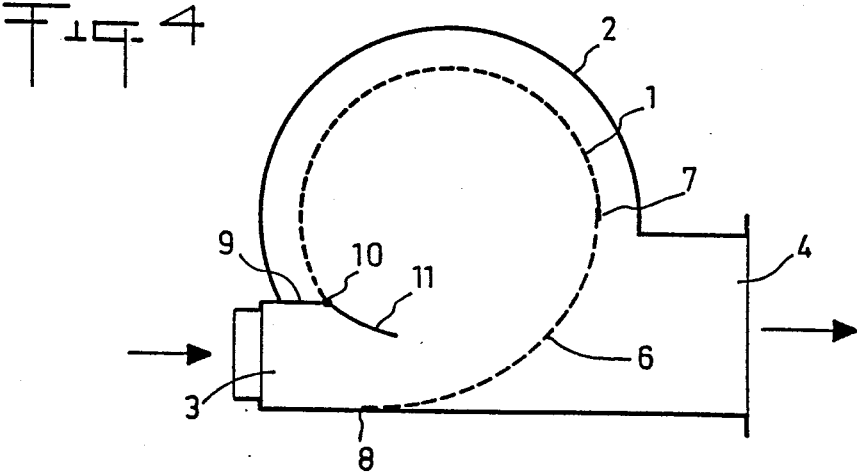

SEPARATOR FOR USE IN INSTALLATIONS FOR CONVEYING OBJECTS OVER DISTANCES BY MEANS OF A FLOW OF AIR

The present invention relates to a separator for use in installations for conveying objects over distances by means of a flow of air.

BACKGROUND OF THE INVENTION

In many industries, a flow of air is used for transporting various types of object, both objects of value and also all kinds of waste and scrap. The flow of air is obtained by flowing or by suction or by a combination of these two techniques. This is done by means of aspirators, or injectors, or equivlent devices, in which a suitably formed air inlet (or more generally gas inlet) induces a flow of air (or gas) containing the objects to be transported. At the end of the installation (or more generally on the flow path), there is naturally a need for separating said transported objects from the air (or gas) transporting them. Devices for providing this separation are called separators.

This separation function must take account of the shape of the transported objects, of their density, of their concentration in the air flow, and of their speed of travel.

It is also necessary to ensure that separation is as thorough as possible and in particular to prevent the objects from being accompanied by residual air which could disturb subsequent operations to be performed on the objects.

To perform this type of separation, proposals have been made for devices called cyclones and for devices called separators. These two types of device operate on different principles: for cyclones, the transported objects are thrust by the centrifugal force of the air against the outer wall of the device with the air leaving via the top middle portion of the device; whereas in separators, the objects are recovered on a grid or perforated plate and the air which passes through the grid generally leaves the device tangentially.

As mentioned above, these two types of device operate on different principles, and consequently they generally have different applications.

Devices of the separator type are more generally used for separating transported objects which, together with the air serving to transport them, occupy a certain volume, with separator devices, other things being equal, having the advantage of occupying considerably smaller volumes than would be required for the corresponding cyclones.

Numerous proposals have already been made for a wide variety of separators including separation grids which are plane or cylindrical. One separator now on the market is constituted by a cylindrical grid which is open at its top and bottom ends and which is surrounded by a solid cylindrical envelope leaving an empty space between tthe envelope and the grid. The air (or gas) entraining the transported objects arrives at the top of the grid travelling tangentially thereto. The air passing through the grid is recovered in an exhaust disposed tangentially relative to said envelope and preferably located at the bottom thereof. The top of the grid and envelope assembly is closed by a cover and the bottom of the envelope is constituted by a truncated conical portion connected directly to the grid so as to collect the objects that have been transported and separated from the air by said grid. Said truncated cone which may optionally be connected to an airtight enclosure (when suction is used) is designed in such a way that it sets up a head loss so that the air which leaves said truncated cone together with the "concentrated" objects is at a pressure which is zero or very close to zero, or is at a pressure that is compatible with the pressure of the suction device.

One such separator is shown diagrammatically in elevation in FIG. 1 and in section on II—II in FIG. 2.

These figures show:

the cylindrical grid 1;

the outer envelope 2;

the high tangential inlet 3 for the mixture of air and transported objects;

the air outlet 4; and the truncated cone 5 via which the objects are removed after being separated from the air.

The present invention relates to a separator which is an improvement over the cylindrical separators described briefly above.

SUMMARY OF THE INVENTION

In said improved separator the cylindrical grid is deformed over a certain height which is not less than the height of the inlet tube admitting the transported mixture of air and objects, said deformation serving to constitute a portion of a spiral extending outside the circular section of said cylinder, said spiral connecting tangentially firstly to said cylinder and secondly to the outside wall of said pipe for admitting the mixture of air and objects, with an adjustable flap being disposed on the line of connection between the inside wall of said inlet pipe and said cylindrical grid, said flap serving to control the flow of air and objects entering the separator, and the portion of the grid whose section is in the form of a portion of a spiral is made so as to avoid having a surface which is smooth to the gas flow.

A preferred way of implementing this non-smooth surface is to use a knitted metal. Such knitting includes bumps and sharp points, with the bumps faciliating the passage of a very considerable quantity of the feed gas flow through said grid. The remainder of the cylindrical grid is advantageously constituted by a free-standing perforated metal sheet.

Advantageously the portion of the grid which is deformed so as to constitute a portion of a spiral is made of a material which withstands wear (abrasion) very well, e.g. stainless steel. Further, given said rapid wear, it is advisable to mount said deformed grid portion in such a manner as to be dismountable and easily changed. Naturally, for this purpose, appropriate hatches need to be made through the outer envelope.

Finally, it will be observed that it may be advantageous for the remaining cylindrical grid (which is advantageously constituted by a free-standing perforated metal sheet, as mentioned above) to be spiral in cross-section rather than circular so as to run on from the spiral provided in accordance with the invention, even though such a structure is more difficult to provide industrially.

BRIEF DESCRIPTION OF THE DRAWINGS

An embodiment of the invention is described by way of example with reference to the accompanying drawings, in which:

FIGS. 3 and 4 are respectively an elevation view and a cross-section on IV—IV of a separator in accordance with the present invention.

MORE DETAILED DESCRIPTION

Figure 1:
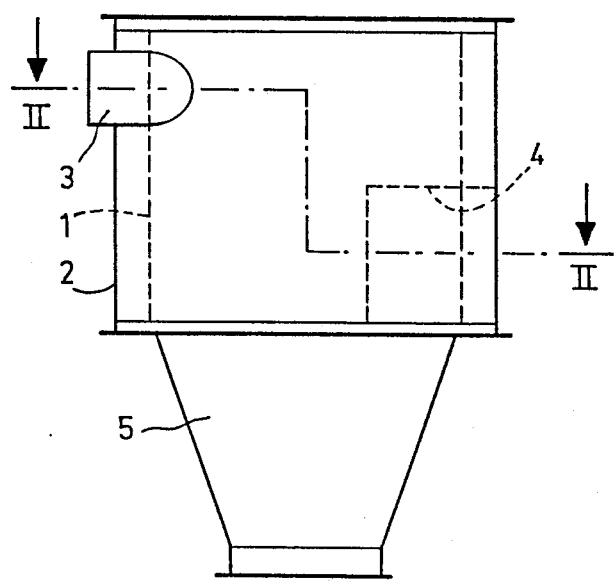
FIGS. 1 and 2 are respectively an elevation view and a cross-section on II—II of a prior art separator, as described above.
Figure 2:
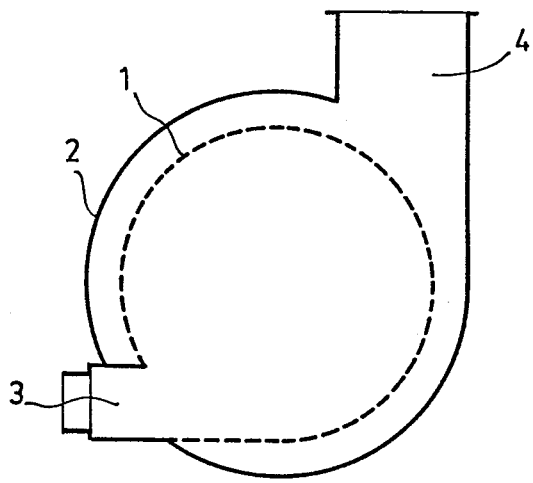

FIGS. 3 and 4 show:

a separation grid 1, said grid being generally cylindrical in shape but including a deformed top portion as described below;

an outer envelope 2;

a top tangential inlet 3 for the mixture of air and transported objects;

an air outlet 4; and a truncated cone 5 via which the objects are removed after being separated from the air.

The bottom of the separator grid 1 is in the form of a cylinder of circular section. This cylinder continues to the top portion of the grid, but in accordance with the invention a portion of the separator, e.g. one fourth thereof, has a deformed wall portion 6. The wall portion 6, which lies outside the cylinder of grid 1, is tangential a line at 7 to said cylinder and is also tangential to the outside wall 8 of the inlet pipe 3 (which, very generally, is rectangular or square in section). The inside wall 9 of the inlet pipe 3 intersects the grid along a generator line of intersection 00 10 and the axis of a flap 11 is disposed along said line. The flap may be moved from outside the separator and is shaped appropriately for controlling the flow of the air entering the grid and running round the portion 6 of the grid.

It may be observed that between tangent line 7 wall and 8, the shape of the grid wall portion 6 is substantially that of a spiral.

This portion 6 of the grid whose right cross-section is in the form of a portion of a spiral is constituted, for example, by a knit (mesh) of stainless steel wire leaving square openings having a side of about 2.5 mm. This portion 6 is held by a frame (not shown) which is removably fixed to a portion of the generator line of the cylindrical grid at 7 and also to the outside wall of the inlet pipe at 8.

An opening (not shown) provided in the air outlet tube 4 makes it possible to dismount and replace said portion 6.

Preferably, the cylindrical grid 1 may be made from perforated free-standing metal sheet having holes which are about 5 mm in diameter.

Separators having the characteristics of the invention have the following main advantages over prior art cylindrical separators:

they occupy a smaller volume since the cylindrical portion of the grid may have a smaller diameter than that which would otherwise be required if the grid were completely cylindrical; and the operation of the separator can be adapted by appropriate adjustment (in particular of the flap) to the inevitable variations in the flow rate admitted to the device and in the concentration of solid materials in said flow.

I claim:

1. A separator for separating objects from air which moves over a distance to transport the objects, the separator comprising:
   (a) a cylindrical casing,
   (b) an inlet for a stream of air and objects transported thereby, said inlet being substantially tangential to said casing, and having an outside wall,
   (c) an air outlet extending substantially tangentially from said casing,
   (d) an outlet for solids at the bottom of said casing,
   (e) means for separating solids from the air comprising
     (i) a generally cylindrical separator grid within and spaced from said casing, and
     (ii) a spiral grid portion tangential to the outside wall of said inlet and to the generally cylindrical grid,
   said grid and grid portion comprising means for passing air therethrough and for preventing the passage of objects therethrough, said spiral grid portion having a non-smooth inner surface,
   (f) said generally cylindrical grid and said inlet intersecting along a line of intersection substantially parallel to the axis of said generally cylindrical grid, and
   (g) adjustable flap means pivotally secured at an edge thereof substantially along said line of intersection for controlling the flow of air and objects entering the separator.

2. The separator of claim 1, wherein said spiral grid portion is knit metal wires.

3. The separator of claim 1, wherein said spiral grid portion is knit stainless steel wires.

4. A separator for separating objects from air which moves over a distance to ransport the objects, the separator comprising:
   (a) a cylindrical casing,
   (b) an inlet for a stream of air and objects transported thereby, said inlet being substantially tangential to said casing, and having an outside wall,
   (c) an air outlet extending substantially tangentially from said casing,
   (d) an outlet for solids at the bottom of said casing,
   (e) means for separating solids from the air comprising
     (i) a generally cylindrical separator grid within and spaced from said casing, and
     (ii) a spiral grid portion tangential to the outside wall of said inlet and to the generally cylindrical grid,
   said grid and grid portion comprising means for passing air therethrough and for preventing the passage of objects therethrough,
   (f) said generally cylindrical grid and said inlet intersecting along a line of intersection substantially parallel to the axis of said generally cylindrical grid, and
   (g) adjustable means for controlling the flow of air and objects entering the separator and for changing the angle thereof relative to the spiral grid portion.

* * * * *